Oct. 30, 1951 M. H. ELLIS 2,573,095
INTAKE MANIFOLD FOR INTERNAL-COMBUSTION ENGINES
Filed March 29, 1947

Inventor
MAX H. ELLIS,
By
Robert W. Fulwider
Attorney

Patented Oct. 30, 1951

2,573,095

UNITED STATES PATENT OFFICE 2,573,095

INTAKE MANIFOLD FOR INTERNAL-COMBUSTION ENGINES

Max H. Ellis, Huntington Park, Calif.

Application March 29, 1947, Serial No. 738,200

7 Claims. (Cl. 123—122)

My invention relates to internal combustion engines and more particularly to the operation of such engines in a manner to increase the efficiency thereof.

As is well known, the operation of the usual internal combustion engine depends upon the charging of its cylinders with a mixture of vaporized fuel and air, and the ignition of this charge. In order to secure the maximum efficiency, it is necessary that the fuel be completely vaporized, and heretofore many attempts have been made to improve the vaporization by applying heat to the intake manifold conducting the fuel and air mixture from the carburetor to the various cylinders. This auxiliary heating of the manifold has been very successful, and has improved the starting characteristics of many engines, especially under cold or freezing conditions. However, the temperature of the manifold is normally increased as the engine warms up, and the need for the auxiliary heat is reduced. Consequently, various thermostatically controlled devices have been proposed to decrease the heat applied to the manifold or to the incoming air as the operating temperature of the engine is raised.

When an internal combustion engine is operated continuously for long periods of times, as in the case of trucks, buses, and other vehicles operated in inter-city and inter-state transportation, the heat conducted to the manifold from the cylinder block through the various intake pipes is more than sufficient to vaporize all the fuel passing through the manifold, and the manifold becomes much hotter than it need be. When this occurs, the gases within the manifold expand, thereby lowering their density so that a smaller amount, by weight, of fuel and air is drawn into each of the cylinders each time the latter are charged. While the ratio of the mixture of fuel and air may remain the same, this reduction in the amount of the mixture which is drawn into the cylinders results in a lowering of the power output of the engine, and its efficiency is therefore generally impaired. In addition, the heating effect of the manifold usually changes the ratio of the fuel and air mixture and thus the efficiency of the engine is even further decreased.

It is therefore a major object of my invention to provide a method of operating an internal combustion engine in a manner to improve its efficiency, and to provide a means for effecting this method of operation.

Another object of my invention is to provide an intake manifold for an internal combustion engine in which the gases within the manifold are maintained as cool as practical.

It is a further object of my invention to provide a manifold of this type making use of the airstream normally passing around the engine.

Still another object of my invention is to provide a manifold having these improved characteristics which may be applied to existing engine installations with a minimum of work and inconvenience.

It is a still further object of my invention to provide an improved manifold of this type which may be produced and sold at a relatively low price to the ultimate consumer.

These and other objects and advantages of my invention will become apparent from the following description of preferred and optional forms thereof, and from the figures illustrating those forms in which.

Figure 1:
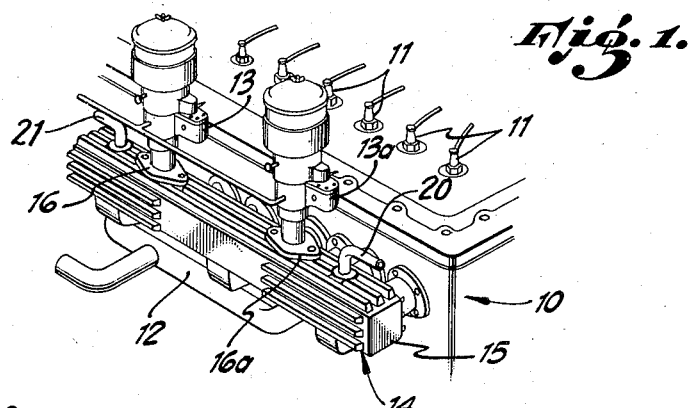
Figure 1 is a perspective utility view of my improved manifold as it may be applied to an automotive engine.
Figure 2:
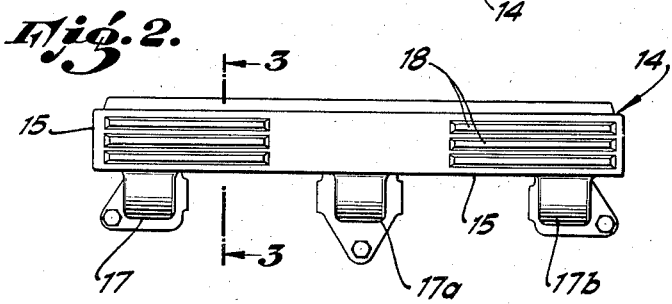
Figure 2 is a side elevational view of the manifold shown in Figure 1.
Figure 3:
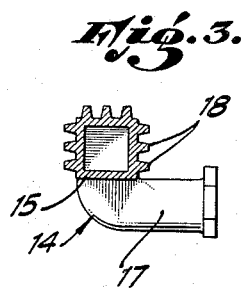
Figure 3 is a sectional view taken at 3—3 in Figure 2.

Referring now to the drawings and particularly to Figures 1 to 3 thereof, the numeral 10 indicates generally the cylinder block of an internal combustion engine, the latter normally being provided with spark plugs 11, an exhaust manifold 12, and the other usual accessories and equipment (not shown). In addition, the engine is provided with some form of fuel carburetion equipment, herein shown as a pair of carburetors 13 and 13a, and an intake manifold 14 connects the outlets of the carburetors to the various cylinders of the engine. The manifold 14, shown in greater detail in Figures 2 and 3, functions is a conventional way to distribute fuel and air from the carburetors 13 and 13a to the individual cylinders, but as previously indicated, the manifold also acts to prevent the fuel and air mixture from being excessively heated during its passage therethrough.

To provide for the cooling of the engine, it is customary to provide a jacket filled with a cooling medium and place a heat exchanger or radiator in front of the engine through which air is forced to cool the cooling medium. In its passage through the radiator, the air is warmed slightly but is still much cooler than the engine and its attached members. Consequently, I place my intake manifold so that it is located in the stream of air which has passed through the radiator, and provide the manifold with cooling fins which increase its effective surface. As hereinafter described, other forms of manifold may be used, but I prefer to use the manifold shown in Figures 2 and 3 where the stream of air passes lengthwise along the manifold, as it does in the usual automotive engine installation.

While most previous intake manifolds have been of a generally cylindrical shape, it will be realized that a cylindrical pipe of circular cross-section has the least possible surface for a given volume capacity, and hence there will be a minimum of conduction and radiation of heat from this surface. The surface area for a pipe of given capacity may be increased by providing the pipe with a polygonal cross-section, such as a triangle, but the difficulties of making the necessary connections to a triangular pipe render its use impractical. Consequently, I have found that a pipe having a rectangular and preferably a square cross-section provides a very large surface area and forms a very practical shape from the standpoint of manufacture and of making the necessary connections. Furthermore, by placing ribs or fins on the surface of the pipe, I am able to increase this radiating and conducting surface even more.

As indicated in Figures 2 and 3, my preferred form of intake manifold 14 includes a rectangular header pipe 15 having suitable connections 16 and 16a for attachment to the carburetors 13 and 13a, and having suitable ports and conduits 17, 17a and 17b for transmission of the fuel and air mixture to the various cylinders. Since the air from the radiator usually flows axially along the header pipe 15, in my preferred form I attach a plurality of longitudinally extending fins 18 to the upper and outer surfaces of the pipe. By extending the fins 18 longitudinally along the header pipe 15, they create a minimum of turbulence and shielding while providing the necessary cooling surface. Where the surface of the header pipe 15 is more or less shielded from the flow of cooling air, the use of the fins 18 is generally unnecessary, and consequently I omit them from the lower surface of the header pipe 15 to which the conduits 17, 17a and 17b are attached. The ports and their associated conduits are generally of such a shape and configuration as to effectively shield this surface of the header pipe 15 from the principal current of air, and consequently little advantage is to be gained from placing the fins 18 on this surface. In addition, I have generally found it undesirable to place the fins 18 on the surface of the header pipe adjacent the cylinder block 10 of the engine since the latter is generally at a much higher temperature than the header pipe, and consequently radiates a considerable amount of heat to the latter. By making this side of the header pipe reflective and with a minimum of surface area, the heat transfer from the engine to the adjacent side of the header pipe may be reduced to a minimum.

Since my improved manifold is often intended as a replacement for an intake manifold of an existing internal combustion engine, the dimensions of the manifold are generally dictated by the space available for it. However, where there is adequate space available or where the manifold is being incorporated in the design of an engine, I prefer to design the ports and conduits 17, 17a and 17b therefore so that the header pipe 15 is spaced from the cylinder block 10 to provide an air space between the two. In this way, conduction of heat from the cylinder block 10 to the header pipe 15 is reduced to the amount which is transmitted by the conduits 17, 17a and 17b; the effect of radiant heat is also reduced; and the flow of air between the cylinder block and the header pipe further aids in the cooling of the latter.

While a manifold of this type may be formed of any one of a number of suitable materials, it is generally preferable to make it of a material having a high heat conductivity so that the temperature of the entire manifold 14 will be maintained more or less uniform. It is to be expected that certain portions of the manifold will be subjected to a greater cooling than others, and were a material of relatively low heat conductivity used, the manifold would tend to develop "hot spots" which would seriously impair its efficiency. However, by casting the manifold 14 of aluminum or an aluminum alloy, a lightweight, easily machinable device is produced which has the desired heat conductivity.

While it is not essential that the manifold 14 be cast, such a procedure has the advantage of permitting the fins 18 to be formed integrally with the header pipe 15 and simultaneously reducing the number of machine operations which must be performed on the manifold. Provision may simultaneously be made for receiving the connections 16 and 16a to the carburetors 13 and 13a, and provision may also be made for other connections such as connections 20 and 21 which may be attached to various vacuum-operated devices normally found on vehicles.

While the preferred form of my device makes use of a rectangular header pipe 15 having longitudinally extending fins 18, it will be apparent that modifications may be made in both the cross-sectional shape of the header pipe and the alignment of the fins. For example, where the flow of air is across the header pipe 15 instead of along its length, the form shown in Figure 4 may be used to secure more efficient cooling. In this form, the header pipe 15 has its same rectangular form but the fins 18a extend across the pipe instead of along its length. This form, it is to be understood, may be used where the flow of air is along the length of the pipe 15, while the preferred form, shown in Figures 2 and 3, may be used where the flow of air is across the pipe, though usually the fins will be oriented with the flow of air. In general, the particular shape or disposition of the fins is relatively unimportant so long as the desired cooling effect is achieved.

Figures 4, 5:
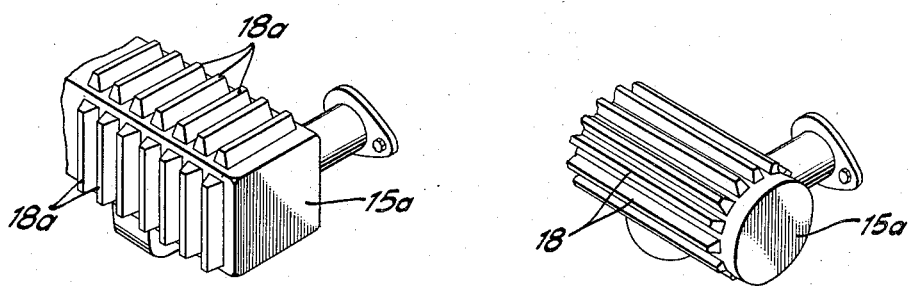
Figure 4 is a perspective view of one end of an optional form of my manifold.
Figure 5 is a similar view of another optional form of my manifold.
Figure 6:
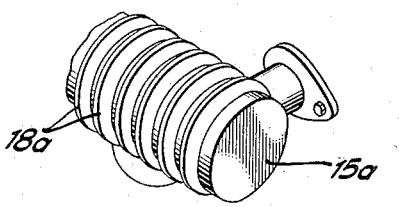
Figure 6 is a perspective view of still another optional form.

In a similar manner, I have indicated in Figures 5 and 6 how my improved intake manifold may be provided with a header pipe 15a having circular cross-section, the form shown in Figure 5 making use of the longitudinally extending fins 18 while the form shown in Figure 6 makes use of the transversely extending fins 18a. As previously mentioned, however, the use of the circular header pipe 15a is generally not so satisfactory as the use of a rectangular pipe, both from the standpoint of the cooling efficiency obtained and from the standpoint of manufacture. In all of the various forms, however, it will be noted that the principal features have been the provision of cooling vanes or fins which are adapted to assist in the cooling of the manifold so that the fuel and air mixture therein is heated as little as practical, and the volumetric efficiency of the engine is thereby increased.

In each of the forms shown, it will be noted that I have provided a means of operating an internal combustion engine in a novel manner. As previously mentioned, it has heretofore been considered advisable to heat the manifold, either with auxiliary equipment or by the construction of the manifold itself, in order to completely vaporize the fuel. However, I have found that under conditions of continuous operation, much better results are obtained from an internal combustion engine if the fuel and air mixture is cooled, rather than heated, thereby reversing previously held beliefs. Under such conditions, the air entering the carburetor is at a high enough temperature to insure the complete vaporization of the fuel without additional heat being intentionally supplied to the manifold.

While I have shown and described preferred and optional forms of my invention, it will be apparent that still other modifications may be made therein and I do not wish to be restricted to the particular form or arrangement of parts herein described and shown, except as limited by my claims.

I claim:

1. An intake manifold for an internal combustion engine which includes: a header pipe of cast aluminum having inlet means adapted to be connected to a carburetor to receive a mixture of fuel and air therefrom, said pipe being of substantially square cross-section and having a heat-reflecting outer surface; conduits cast integrally with said header pipe to form a plurality of outlets therefrom, said conduits being adapted to act as supports for said header pipe to hold the latter in spaced relationship to the relatively hot portions of said engine, whereby air may circulate around all sides of said header pipe; and radiator elements cast integrally with said header pipe on the portion of the outer surface thereof not adjacent said hot portions of said engine, said radiator elements comprising outwardly projecting fins extending longitudinally along said header pipe, adapted to be subjected to a flow of cooling air, whereby heat is dissipated from said header pipe and the contents thereof is maintained relatively cool.

2. An intake manifold for an internal combustion engine, which includes: a header pipe of heat conducting material extending along said engine and spaced therefrom, having a heat-reflecting outer surface and having a port for fluid connection to a carburetor; conduits cast integrally with said header pipe to form a plurality of outlets therefrom, said header pipe providing a straight path for fuel from said port to said conduits with no turns therein, and said conduits acting as supports for said header pipe to space the latter from said engine, whereby the minimum amount of heat is supplied to said fuel in its passage from said carburetor to said engine; and heat radiating fins cast integrally with said header pipe on the portion of the outer surface thereof not adjacent the hot portions of said engine, adapted to be subjected to a flow of cooling air, whereby heat is dissipated from said header pipe and the contents thereof is maintained relatively cool.

3. An intake manifold for an internal combustion engine, which includes: a header pipe of heat conducting material having a heat-reflecting outer surface and extending along said engine and spaced therefrom for the free passage of air therebetween, having a port for fluid connection to a carburetor; conduits cast integrally with said header pipe to form a plurality of outlets therefrom extending substantially perpendicularly from said pipe to said engine and acting to support said pipe and space it from said engine, said pipe receiving an unheated fuel mixture from said carburetor and conducting it to said conduits in a straight unrestricted path; and heat radiating fins cast integrally with said header pipe on the portion of the outer surface thereof not adjacent the hot portion of said engine, adapted to be subjected to a flow of cooling air, whereby the heat supplied to said pipe by conduction is dissipated, and the fuel mixture is delivered to said engine without substantial heating or cooling during its passage from said carburetor.

4. An intake manifold for internal combustion engines, of the type spaced from the block of the engine but connected thereto by conduits, which includes: a header pipe of a heat conducting material, having a smooth, heat-reflecting surface on the portions thereof adjacent the hottest portions of said engine; and heat radiating fins projecting from the remaining portions of said header pipe for cooling the latter.

5. An intake manifold of the type connected to an internal combustion engine by conduits that hold the manifold in spaced relationship with the block and exhaust manifold of said engine, which includes: a header pipe of rectangular cross-section, having a smooth, heat-reflecting surface on the portions thereof adjacent the hottest portions of said engine, whereby the minimum amount of heat is transferred to said header pipe and its contents; and fins projecting from other surfaces of said header pipe to cool the latter and its contents.

6. An intake manifold for an internal combustion engine, which includes: a header pipe of heat conducting material extending along said engine and spaced therefrom, having a heat-reflecting outer surface and having a port for fluid connection to a carburetor; conduits connected to said header pipe to form a plurality of outlets therefrom and acting to space said header pipe from said engine, whereby the minimum amount of heat is supplied to said fuel in its passage from said carburetor to said engine; and heat radiating fins on the portion of the outer surface of said header pipe not adjacent the hot portions of said engine, adapted to be subjected to a flow of cooling air, whereby heat is dissipated from said header pipe and the contents thereof is maintained relatively cool.

7. An intake manifold for an internal combustion engine, which includes: a header pipe of heat conducting material having a heat-reflecting outer surface and extending along said engine and spaced therefrom, adapted to be fluid connected to a carburetor; conduits connected to said header pipe to form a plurality of outlets therefrom; and heat radiating fins on the portion of the outer surface of said header pipe not adjacent the hot portions of said engine, adapted to be subjected to a flow of cooling air, whereby the heat supplied to said pipe by conduction is dissipated, and a fuel mixture received from said carburetor is delivered to said engine without substantial heating or cooling during its passage from said carburetor.

MAX H. ELLIS.

REFERENCES CITED

The following references are of record in the file of this patent:

UNITED STATES PATENTS

| Number | Name | Date |
|---|---|---|
| 1,475,556 | Horning | Nov. 27, 1923 |
| 1,594,213 | Palmer | July 27, 1926 |
| 1,807,042 | Lockhart | May 26, 1931 |
| 1,851,601 | Swan | Mar. 29, 1932 |